US010783550B2

(12) United States Patent
Subramanya et al.

(10) Patent No.: US 10,783,550 B2
(45) Date of Patent: Sep. 22, 2020

(54) SYSTEM FOR OPTIMIZING SPONSORED PRODUCT LISTINGS FOR SELLER PERFORMANCE IN AN E-COMMERCE MARKETPLACE AND METHOD OF USING SAME

(71) Applicant: Wal-Mart Stores, Inc., Bentonville, AR (US)

(72) Inventors: Shankara B. Subramanya, Santa Clara, CA (US); Jagannath Putrevu, Sunnyvale, CA (US); Madhusudan Mathihalli, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 650 days.

(21) Appl. No.: 14/610,973

(22) Filed: Jan. 30, 2015

(65) Prior Publication Data
US 2016/0225015 A1 Aug. 4, 2016

(51) Int. Cl.
G06Q 30/00 (2012.01)
G06Q 30/02 (2012.01)
(52) U.S. Cl.
CPC ..... *G06Q 30/0244* (2013.01); *G06Q 30/0246* (2013.01); *G06Q 30/0247* (2013.01); *G06Q 30/0275* (2013.01); *G06Q 30/0277* (2013.01)
(58) Field of Classification Search
CPC ................................................ G06Q 30/0244
See application file for complete search history.

(56) References Cited

U.S. PATENT DOCUMENTS

| 4,339,633 | A | * | 7/1982 | Ahmed | H04Q 11/0407 370/363 |
|---|---|---|---|---|---|
| 2002/0161476 | A1 | * | 10/2002 | Panofsky | G06Q 20/1235 700/231 |
| 2002/0169657 | A1 | | 11/2002 | Singh et al. | |
| 2003/0126013 | A1 | | 7/2003 | Shand | |
| 2006/0095281 | A1 | * | 5/2006 | Chickering | G06Q 30/02 705/37 |
| 2007/0100981 | A1 | * | 5/2007 | Adamczyk | H04L 69/18 709/223 |
| 2009/0063268 | A1 | * | 3/2009 | Burgess | G06Q 30/02 705/14.39 |
| 2010/0042496 | A1 | * | 2/2010 | Wang | G06Q 10/087 705/14.49 |
| 2011/0047026 | A1 | * | 2/2011 | Biggs | G06Q 30/02 705/14.46 |

(Continued)

Primary Examiner — Bennett M Sigmond
Assistant Examiner — Scott C Anderson
(74) Attorney, Agent, or Firm — Bryan Cave Leighton Paisner LLP

(57) ABSTRACT

A system and method includes configuring a computer system to provide output of one or more advertisements of products to a user device of a consumer, receiving, by the computer system, one or more inputs of impressions, clicks, orders and other KPIs, estimating, by the computer system, for a click through rate (CTR) of advertisements of the products based on the inputs received, optimizing, by the computer system with an optimization module, an estimated revenue and estimated advertisement spending (Adspend) based on the CTR of advertisements, and providing, by the computer system, output of one or more advertisements of the products to the user device of the consumer for display.

21 Claims, 6 Drawing Sheets

(56) References Cited

U.S. PATENT DOCUMENTS

2012/0233183 A1* 9/2012 Nakahashi ............ G06Q 30/02
707/749
2014/0229281 A1 8/2014 Zimmerman, Jr. et al.

* cited by examiner

SYSTEM FOR OPTIMIZING SPONSORED PRODUCT LISTINGS FOR SELLER PERFORMANCE IN AN E-COMMERCE MARKETPLACE AND METHOD OF USING SAME

BACKGROUND OF THE INVENTION

1. Field of the Invention

The present invention relates generally to sponsored product listings for seller performance in an e-commerce marketplace and, more particularly, to a system for optimizing sponsored product listings for seller performance in an e-commerce marketplace and method of using same.

2. Description of the Related Art

It is known that a large retailer typically has a number of items or products stocked either in retail stores or distribution centers. The retailer advertises many of these items or products, for example, groceries, office supplies, household wares, etc. Typically, these advertisements appear on a webpage of a website of the retailer for allowing a consumer to search and/or purchase the products.

The website of the retailer typically hosts a variety of products curated in multiple advertisement formats to cater to different customer needs. For example, different advertisement formats include different advertisement types such as featured brands, e.g., sponsored products from a vendor or seller "X", or sponsored products, e.g., sponsored products from different vendors or sellers "X", "Y", "Z", etc. Typically, the website includes a homepage which gets the highest amount of traffic, search pages where users can search for products and get relevant results, category pages where users can see the different product offerings in different product categories, browse pages for browsing through a more specific category of items or products, topic pages which host highly relevant items or products related to a certain theme or topic, and finally product pages which are for individual items or products. Each page type has different characteristics and results in different types of user behavior.

For creating a successful performance advertisement program, certain goals for all the stakeholders involved need to be met and contribute to the long-term growth of the advertisement marketplace while maintaining high levels of customer satisfaction. For the consumer, the goal is to show the most contextually relevant advertisements, measured by the purchase (conversion) probability of the advertisement. For the advertiser, the goal is to target potential customers and increase discoverability of their products. The advertisers should be able to manage their products' reach by improving their bid prices or improve their performance by targeting specific customer segments. For the advertisement marketplace or the retailer, the goal is to rank the ads based on their performance in terms of conversions and ad revenues. If better products are ranked higher, it incentivizes advertisers to improve their product offerings, which improves the overall website conversions and brings in more revenues for both the advertisers and the retailer.

Performance advertisement (Ad) is a form of e-commerce advertising where a cost of advertising is based on a performance of an advertisement measured through impressions or clicks received by the advertisement. By virtue of the retailer's huge website catalog and presence on the e-commerce space, advertisements are a great platform for generating additional source of revenue for the retailer. The current industry norm is to rely on one of the top advertisement platforms like Google Adsense to use the retailer dotcom's real estate to show third party advertisements. The Google Adsense program is designed based on keywords to incentivize advertising to improve their overall website experience. However, this approach has some disadvantages because of the potential bounces these advertisements can cause on the retailer's website pages. In addition, different sellers and products in an e-commerce marketplace have different conversion rates and profitability. Large eCommerce retailers can leverage their huge customer base and product offerings to attract sellers to advertise products from within the retailer's website and promote specific products.

It is, therefore, desirable to provide a new system and method which optimizes sponsored product listings for seller performance in an e-commerce marketplace for a large retailer. It is also desirable to provide a new system and method that ranks the sponsored product listings based on advertisers' performance and increases advertising revenues. It is further desirable to provide a new system and method that maximizes the marketplace performance by optimizing for website conversion rate while allowing bid prices to be effective levers for the advertisers. Thus, there is a need in the art to provide a system for optimizing sponsored product listings for seller performance in an e-commerce marketplace and method of using same that meets at least one of these desires.

SUMMARY OF THE INVENTION

Accordingly, the present invention provides a system including a computer system configured to provide output of one or more advertisements of products to a user device of a consumer. The computer system is also configured to receive one or more inputs of impressions, clicks, orders, and other KPIs and to estimate a click through rate (CTR) of the advertisements of products based on the inputs received. The computer system is further configured to include an optimization module to optimize the estimated revenue and estimated advertisement spending (Adspend) based on the CTR of advertisements, and to provide output of one or more advertisements of products to the user device of the consumer for display.

In addition, the present invention provides a method including the steps of configuring a computer system to provide output of one or more advertisements of products to a user device of a consumer. The method also includes the steps of receiving, by the computer system, one or more inputs of impressions, clicks, orders and other KPIs, estimating, by the computer system, a click through rate (CTR) of advertisements of products based on the inputs received. The method further includes the steps of optimizing, by the computer system with an optimization module, the estimated revenue and estimated advertisement spending (Adspend) based on the CTR of advertisements, and providing, by the computer system, as output of one or more advertisements of the products to the user device of the consumer for display.

Further, the present invention provides one or more non-transitory computer-readable storage media, having computer-executable instructions embodied thereon, wherein when executed by at least one processor the computer-executable instructions cause the processor to receive one or more inputs of impressions, clicks, orders and other KPIs, which can be used to estimate with the click through rate (CTR) of advertisements of products based on the inputs received. The computer-executable instructions also cause the processor to optimize with an optimization module an estimated revenue and estimated advertisement spending (Adspend) based on the CTR of advertisements, and to provide output of one or more advertisements of the product to a user device of a consumer for display.

One advantage of the present invention is that a new system and method is provided for optimizing sponsored product listings for seller performance in an e-commerce marketplace for a large retailer. Another advantage of the present invention is that the system and method provides an ad-match, which maximizes the marketplace performance by optimizing website conversion rates while allowing bid prices to be effective levers for the advertisers. Yet another advantage of the present invention is that the system and method provides relevant targeted advertisements from the retailer's own website catalog, thereby reducing bounce rate on website pages, increasing website page visits to products, and potentially improving overall website conversions, by creating an auction platform for the retailer's sellers or vendors to bid for advertisement placements and charge them based on a Cost-per-click (CPC) and maintaining industry standard return on advertising spending (ROAS) metrics. Still another advantage of the present invention is that the system and method provides the most contextually relevant advertisement to the user (measured by Conversion Probability of the advertisement). A further advantage of the present invention is that the system and method provides liquidity to advertisers, e.g., bid more to get more revenue, fine grained control: segmentation of customers and pages, for example Broad-match Ads vs. Exact match Ads, and predictability in ROAS. Yet a further advantage of the present invention is that the system and method produce advertising rank based on advertisers' performance, continuously improving conversion rates: the more the customers buy after clicking the advertisements, the better, increasing advertisement revenues and advertisement attributed revenues, and timely and accurate reporting on all KPIs.

Other features and advantages of the present invention will be readily appreciated, as the same becomes better understood, after reading the subsequent description taken in conjunction with the accompanying drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
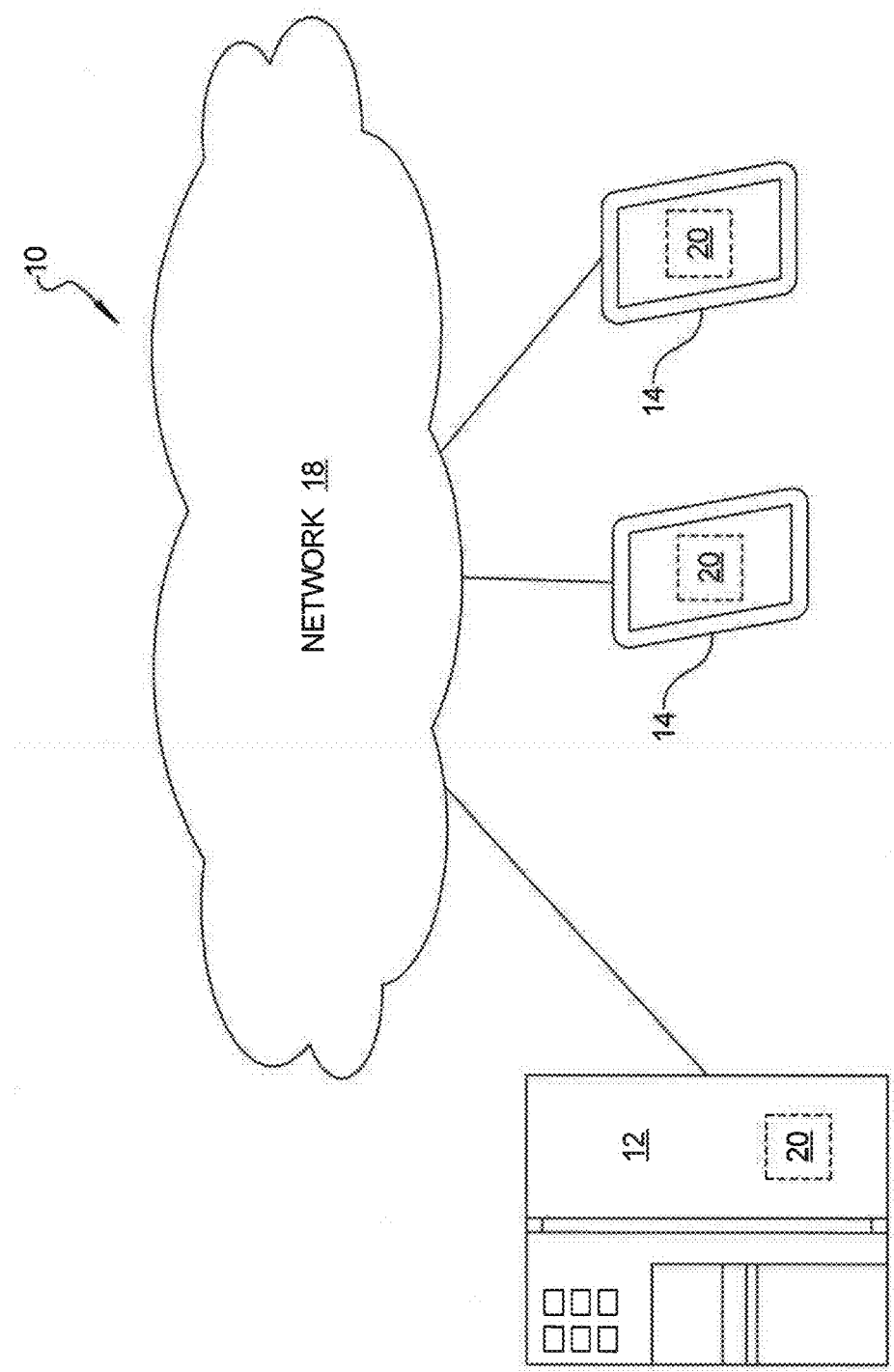
FIG. 1 is a diagrammatic view of a system, according to one embodiment of the present invention, illustrated in relationship with at least one user device of a consumer.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE PREFERRED EMBODIMENT(S)

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand selfservice, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

Different sellers and products in an e-commerce marketplace have different conversion rates and profitability. The disclosure describes an ad-match system for a large retailer which maximizes the marketplace performance by optimizing website conversion rates while allowing bid prices to be effective levers for the advertisers.

With reference to the FIGS. and in operation, the present invention provides a system 10, methods and computer product media that optimize sponsored product listings for seller performance in an e-commerce marketplace for the retailer. In particular, the present invention describes how a system associated with a large retailer optimizes an estimated revenue and estimated advertisement spending (Ad-spend) based on a click through rate estimation model and a conversion probability estimation model to maximize revenue and maintain minimum ROAS levels, and to provide output of one or more advertisements of sponsored product listings to a user device of a consumer for display.

Referring to FIG. 1, an exemplary environment in which the system 10, according to the present invention, operates is illustrated. The system 10 in which methods described hereinbelow may be implemented. The system 10 may include a server system 12 that may be embodied as one or more server computers each including one or more processors that are in data communication with one another. The server system 12 may be in data communication with one or more user devices 14. In the methods disclosed herein, the user devices 14 are advantageously mobile devices such as a mobile phone or tablet computer. In some embodiments, some or all of the methods disclosed herein may be performed using a user device 14 such as a desktop computer or any other computing device as the user device 14. For purposes of this disclosure, discussion of communication with a user or entity or activity performed by the user or entity may be interpreted as communication with a user device 14 associated with the user or entity or activity taking place on a computer associated with the user or entity. In some embodiments, separate computers of the server system 12 may handle communication with the user devices 14.

Some or all of the server 12 and user devices 14 may communicate with one another by means of a network 18. The network 18 may be embodied as a peer-to-peer wireless connection between devices, a connection through a local area network (LAN), WiFi network, the Internet, or any other communication medium or system.

Figure 2:
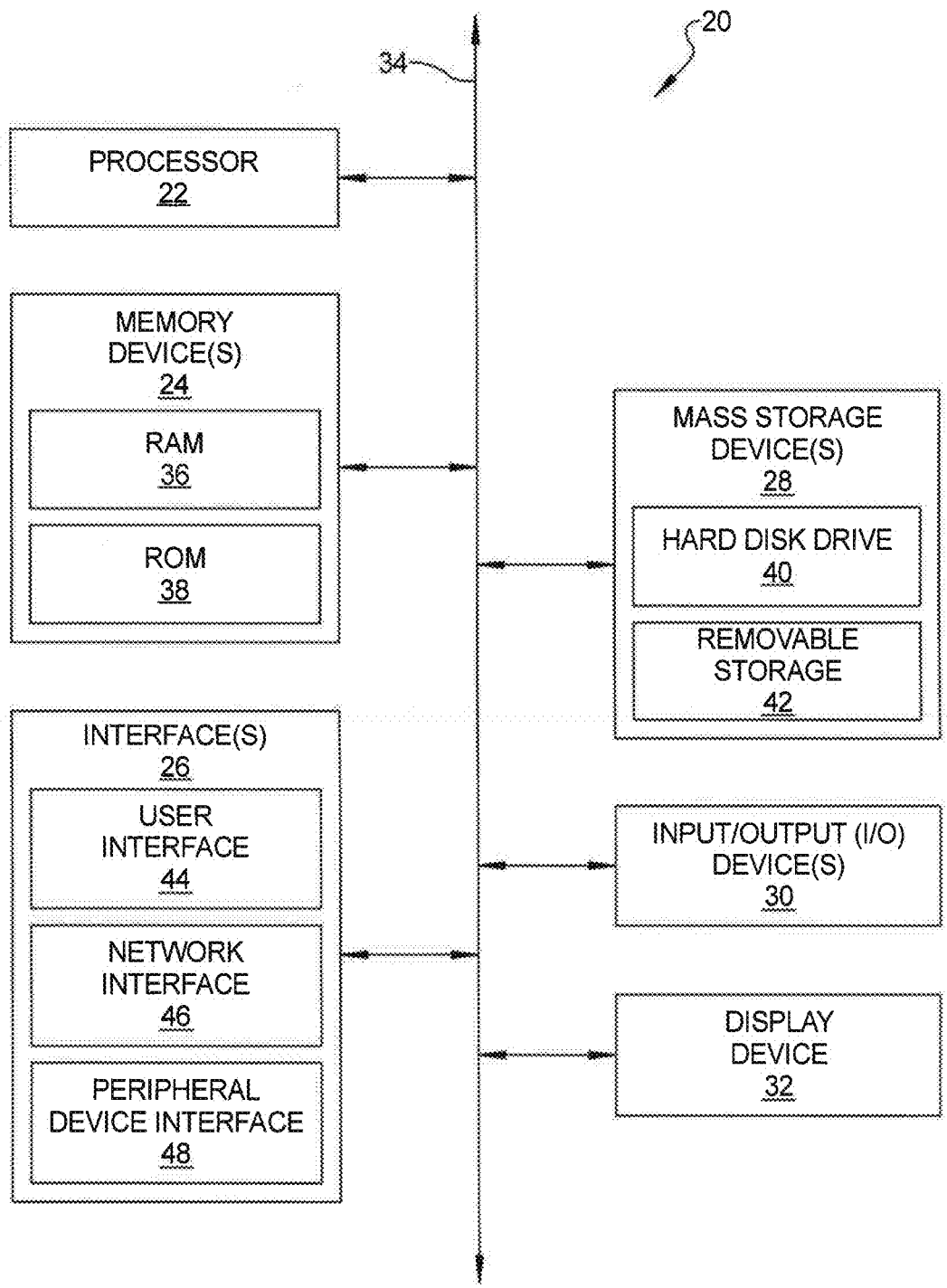
FIG. 2 is a diagrammatic view of a portion of the system of FIG. 1.

Referring to FIG. 2, an example computing device 20 for the system 10 and user device 14 is shown. The computing device 20 may be used to perform various procedures, such as those discussed herein. A sponsored product module may include some or all of the attributes of the computing device 20. The computing device 20 can function as a server, a user, or any other computing entity. The computing device 20 can perform various monitoring functions as discussed herein, and can execute one or more application programs, such as the application programs described herein. The computing device 20 can be any of a wide variety of computing devices, such as a desktop computer, a notebook computer, a server computer, a handheld computer, tablet computer and the like.

The computing device 20 includes one or more processor(s) 22, one or more memory device(s) 24, one or more interface(s) 26, one or more mass storage device(s) 28, one or more Input/Output (I/O) device(s) 30, and one or more display device(s) 32, all of which are coupled to one or more bus(es) 34. The processor(s) 22 include one or more processors or controllers that execute instructions stored in memory device(s) 24 and/or mass storage device(s) 28. The processor(s) 22 may also include various types of computer-readable media, such as cache memory.

The memory device(s) 24 include various computer-readable media, such as volatile memory (e.g., random access memory (RAM) 36) and/or nonvolatile memory (e.g., read-only memory (ROM) 38). The memory device(s) 24 may also include rewritable ROM, such as Flash memory.

The mass storage device(s) 28 include various computer readable media, such as magnetic tapes, magnetic disks, optical disks, solid-state memory (e.g., Flash memory), and so forth. As illustrated in FIG. 2, a particular mass storage device is a hard disk drive 40. Various drives may also be included in mass storage device(s) 28 to enable reading from and/or writing to the various computer readable media. The mass storage device(s) 28 include removable media 42 and/or non-removable media.

The I/O device(s) 30 include various devices that allow data and/or other information to be input to or retrieved from computing device 20. Example I/O device(s) 30 include cursor control devices, keyboards, keypads, microphones, monitors or other display devices, speakers, printers, network interface cards, modems, lenses, CCDs or other image capture devices, and the like.

The display device(s) 32 include any type of device capable of displaying information to one or more users of computing device 20. Examples of the display device 32 include a monitor, display terminal, video projection device, display, graphical user interface (GUI), and the like.

The interface(s) 26 include various interfaces that allow the computing device 20 to interact with other systems, devices, or computing environments. The interface(s) 26 may include one or more user interface 44 such as GUIs. The interface(s) 26 may include one or more network interfaces 46. Example interface(s) 26 may include any number of different network interfaces 46, such as interfaces to local area networks (LANs), wide area networks (WANs), wireless networks, and the Internet. The interface(s) 26 may also include one or more peripheral device interfaces 48 such as interfaces for printers, pointing devices (mice, track pad, etc.), keyboards, and the like.

The bus(es) 34 allow the processor(s) 22, memory device(s) 24, interface(s) 26, mass storage device(s) 28, I/O device(s) 30, and display(s) 32 to communicate with one another, as well as other devices or components coupled to the bus 34. The bus 34 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of the computing device 20, and are executed by the processor(s) 22. In some embodiments, the systems and procedures described herein can be implemented in hardware, or a combination of hardware, software, and/or firmware. For example, one or more application specific integrated circuits (ASICs) can be programmed to carry out one or more of the systems and procedures described herein.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions as performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

Figure 3:
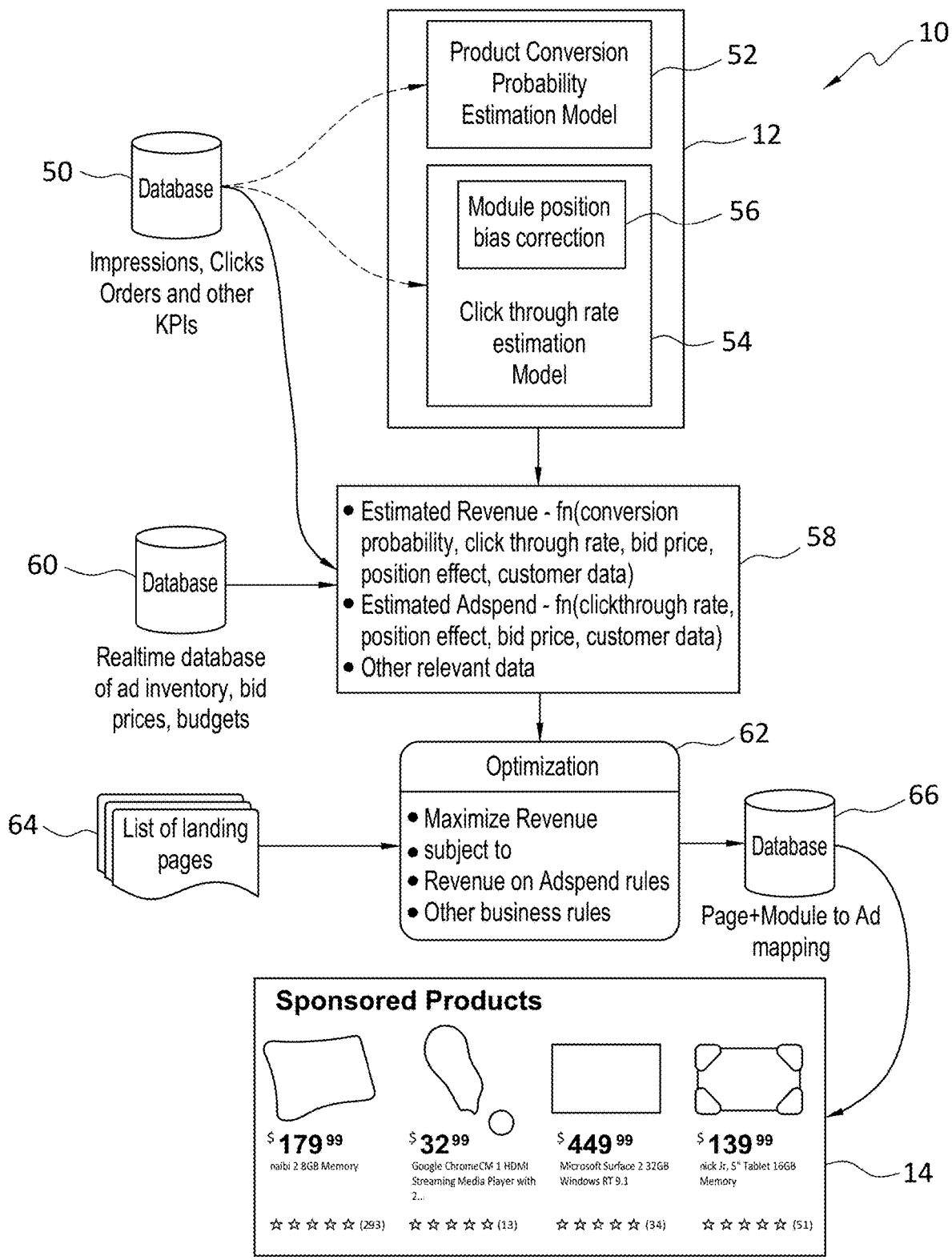
FIG. 3 is a diagrammatic view of one embodiment of the system and user device of FIG. 1.

Referring to FIG. 3, one embodiment of the system 10 is shown for optimizing sponsored product listings for marketplace performance in e-commerce. In one embodiment, the system 10 includes a database 50 having impressions, clicks, orders and other key performance indicators (KPIs). An impression (which may be a set of impressions over a time interval) of a consumer (in the context of online advertising) is a measure of the number of times an advertisement for a particular item or product is seen by the consumer. Clicking or not is not taken into account. Each time an advertisement displays it is counted as one impression. A click may be a consumer clicking on the advertisement with a mouse button or the pressing down and rapid release of a mouse button. An order may be a consumer ordering a particular item or product. KPI is a set of quantifiable measures that a retailer or industry uses to gauge or compare performance in terms of meeting their strategic and operational goals. It should also be appreciated that KPIs vary between retailers, companies, and industries, depending on their priorities or performance criteria.

The system 10 also includes a product conversion probability model 52 to be described. The product conversion probability model may receive one or more inputs from the database 50. It should be appreciated that the conversion probability p is the likelihood of a purchase once the consumer has clicked on an advertisement.

The system 10 further includes a click through rate (CTR) estimation model 54 to be described. The CTR estimation model 54 may receive one or more inputs from the database 50. CTR is the unbiased estimate of click through rate for a given advertisement on a given landing page of the website of the retailer. The CTR estimation model 54 may include a model position bias correction 56 to be described. Position bias is the position of the products in the advertisement. It should be appreciated that the server 12 may contain the models and provide an output. It should also be appreciated that the server 12 may contain the database 50 or communicate with the database 50.

The system 10 also includes an estimation module 58 receiving the output from the CTR estimation model 54 for estimating revenue and estimating advertising spending (Adspend). As will be subsequently described, the estimated revenue is a function of conversion probability, CTR, bid price, position effect, and customer data. The estimated Adspend is a function of CTR, position effect, bid price, and customer data. The system 10 includes a real-time database 60 of advertisement inventory, bid prices, and budgets collected by the retailer. The estimation module 58 may receive one or more inputs of advertisement inventory, bid prices, and budgets from the database 60. In on-line advertising, advertisement inventory is often calculated in terms of the number of page impressions—an impression being defined as one user looking at one advertisement. The more page impressions a site has, the more money the publisher can demand for its advertisement space, since advertisers are receiving access to a large audience. Bid prices are the highest prices that an advertiser is willing to pay for an advertisement. Budget is the money an advertiser is willing to set aside to accomplish its marketing objectives. The server 12 may contain the module and provide an output to an optimization module 62 to be described. It should be appreciated that the server 12 may contain the database 60 or communicate with the database 60.

The system 10 further includes an optimization module 62 having an optimization process to be described. The system 10 also includes one or more website landing pages and provides a list 64 of the website landing pages to the optimization module 62. The optimization module 62 has an optimization process to maximize revenue subject to revenue on Adspend rules and other business rules defined by the retailer. The system 10 further includes a database 66 of the website landing page plus module to advertisement mapping. The server 12 may contain the optimization module 62 and website landing pages and provide an output to the database 66. The database 66 provides one or more advertisements of sponsored product listings on the retailer's website landing page to the user device 14 for display to the consumer. It should be appreciated that the advertisement displays one or more sponsored products listings. It should also be appreciated that the server 12 may contain the database 66 or communicate with the database 66 and the database 66 communicates with the display of the user device 14.

Figure 4:
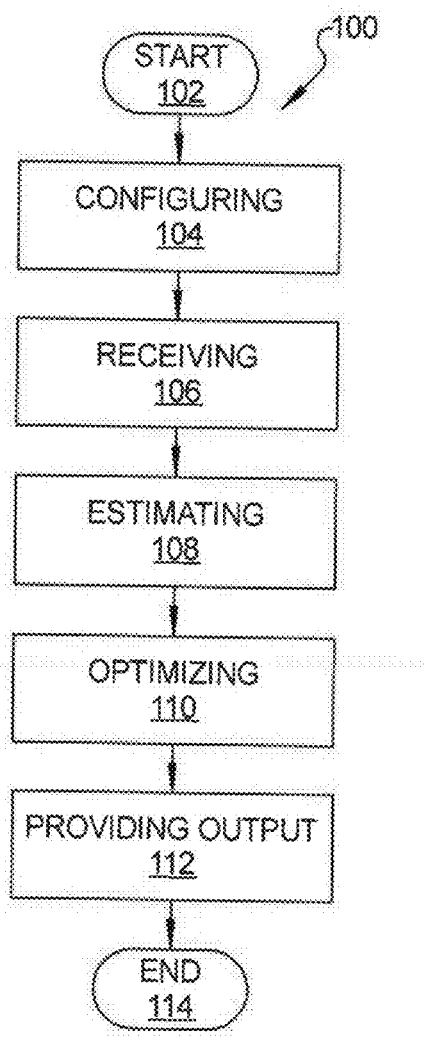
FIG. 4 is a flowchart of a method, according to one embodiment of the present invention, used with the system of FIGS. 1 through 3.
Figure 5:
FIG. 5 is a screenshot view of an image on the user device using the system of FIG. 1.

Referring to FIG. 4, a flowchart of a method 100, according to one embodiment of the present invention, used with the system 10 of FIGS. 1 through 3 is shown. The method 100 may be embodied in a sponsored products module for the system 10. The method 100 starts in block 102. The method includes the steps of configuring the system 10 to provide output of one or more advertisements of sponsored product listings to the user device 14 of a consumer in block 104. The method 100 also includes the step of receiving one or more inputs in block 106. For example, receiving, by the system 10, one or more inputs of impressions, clicks, orders and other KPIs as previously described. The method 100 further includes estimating a CTR in block 108. For example, estimating, by the system 10, with a CTR model for a click through rate of advertisements of the sponsored products based on the inputs received. The method 100 also includes the step of optimizing estimated revenue and advertisement spending in block 110. For example, optimizing, by the system 10 with an optimization module, an estimated revenue and estimated advertisement spending (Adspend) based on the CTR model. The method 100 further includes the step of providing output in block 112. For example, providing, by the system 10, output of one or more advertisements of the sponsored product listings to the user device 14 of the consumer for display. The method then ends in block 114.

Advertisement (Ad) Format

The website of the retailer hosts a variety of products curated in multiple formats to cater to different customer needs. The website of the retailer includes a homepage that gets the highest amount of traffic, search pages where users can search for products and get relevant results, category pages where users can see the different product offerings in different product categories, browse pages for browsing through a more specific category of items, topic pages which host highly relevant items or products related to a certain theme or topic and finally product pages which are for individual items or product. Each page type has different characteristics and results in different types of user behavior. By optimizing for each page type and each landing page separately, the set goals previously described can be achieved for all stakeholders and derive maximum impact. The retailer has two different advertisement formats viz., "Featured products from <Brand>", "Sponsored Products" to give advertisers the flexibility to choose what works best for them.

Segmentations for Advertisers

To meet the goal of giving advertisers fine-grained control over their inventory, it is important to go to a granular level and segment the Ads. There are three types of segmentations: page type level segmentation—Ads on homepage get lot more impressions than on other page types; taxonomy/site category based segmentation—expected revenue varies across different product categories for every advertiser; and relevance segmentation—query based ranking: Broad Match vs. Exact Match; item match ranking: Estimated CTR and Estimated Revenue; and popularity match ranking: Direct Match vs. Indirect Match.

Models for Ranking Products

The approach to rank the products which are to be shown on a given page type in a given format for a given customer depends on several qualitative and quantitative attributes: bid price b: the cost per click for the advertiser; CTR: the unbiased estimate of click through rate for a given ad on a given landing page; customer profile C: a set of attributes which depend on the customer's past viewing history and purchase history, which can act as a penalty/boost for an advertisement's rank; and probability p is the conversion probability previously described.

The rank of an ad is therefore a function of above attributes: fn(b, CTR, p, C). By taking this approach, the system 10 will make the trade-off between bid price and conversion probability so that a product with higher probability of conversion will have to pay lesser to rank higher, thereby incentivizing the advertisers and brands to improve their product quality and increase conversions.

Apart from CTR, all the other attributes of the ranking function are dependent on the sponsored product and not on the page type or ad format. Unbiased expected CTR can be a proxy metric for pure contextual relevance of an advertisement. This is different for different page types. For example, search pages: a textual analytic metric like TF-IDF (Term Frequency-Inverse Document Frequency) score; category/shelf pages: TF-IDF for keyword based ranking and normalized rank score for popularity based ranking; home page: normalized rank score; and product pages: statistical model trained on the large amount of data the retailer already has on customers' responses to personalized recommendation modules on different retailer website pages.

CTR Estimation

For product pages, a CTR model predicts the probability that a customer will click on a sponsored product given a parent product page. If View is defined as an event which is the act of impressing a sponsored item on a product page P, and Click as an event which is the act of clicking on a sponsored item I, the goal is to estimate ctr=Prob (Click$_i$=1|View$_i$=1). In one embodiment, this is modeled as a logistic regression problem where the probability of click:

$$ctr = \frac{1}{1 + \exp(-(\beta_0 + \beta_1 x_1 + \cdots + \beta_n x_n))},$$

[$x_1, x_2, \ldots, x_n$] is a set of significant features and [$\beta_0, \beta_1, \ldots, \beta_n$] are a set of coefficients. This can be re-written as $$\log\left(\frac{ctr}{1-ctr}\right) = \beta_0 + \beta_1 x_1 + \cdots + \beta_n x_n$$

This is now a linear regression model to estimate $$\text{logit}(ctr) = \log\left(\frac{ctr}{1-ctr}\right).$$

Some of the features considered for modeling this problem are item name text similarity score, price ratio between product page item and sponsored item, the ratings and reviews of both parent item and sponsored item, relevance score between items across common topics which both items belong to, taxonomies and their similarities of parent item and sponsored item, number of page visits for parent item and sponsored item, number of visits where a user went from parent item page to sponsored item page, probability that these two items are visited in the same session, etc.

One of the key challenges for solving this problem is the inherent bias in the CTR data collected. The module has a carousel and therefore can host multiple ads in the range 4-20 on any given item page. It should be appreciated that, depending on the consumer's Internet browser width, the number of ads seen by the customer can vary.

Figure 6:
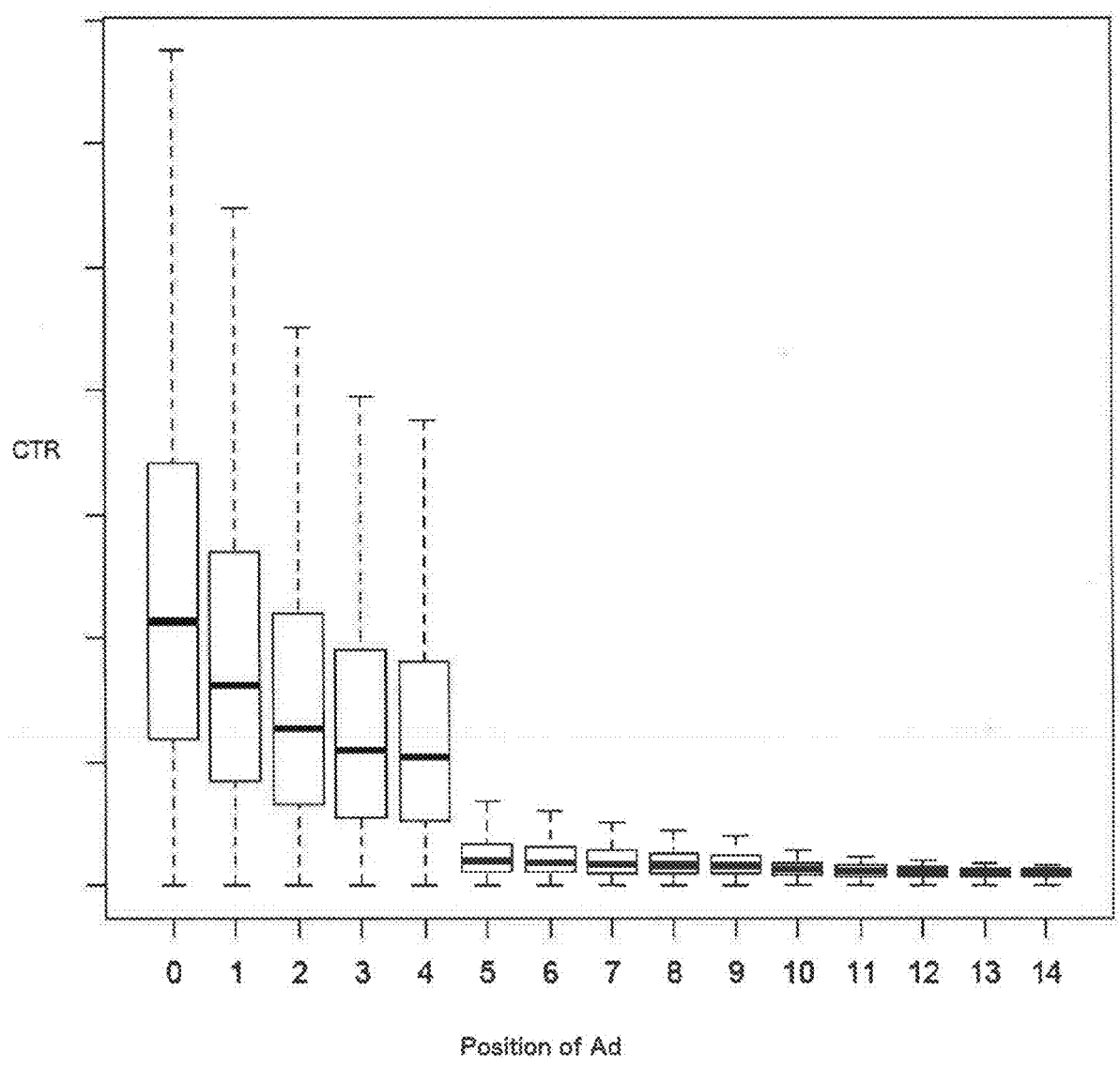
FIG. 6 is a graphical view of bias in a click through rate estimation model of the system of FIG. 1.

Referring to FIG. 6, the image indicates how the sponsored products module looks like on the large retailer website item pages. As illustrated, the top 4-6 items (varying based on browser window width) get more visits than the ones that are later in the pecking orders. So for the estimation model, the bias has to be corrected for that position of the item in the module creates for items shown on the left most side of the page.

Referring to FIG. 7, a decreasing pattern is seen in the average CTR values going to positions 5 and above (numbered from 0 to 14). In positions 0 to 4, some of the trend is because of the inherent difference in the relevance of the items and these items were ranked to be shown in that order based on relevance scores. But by running some experiments on showing the same item in different positions, some positional effects were noticed even in positions 0 to 4. It should be appreciated that this position bias needs to be eliminated for an unbiased estimate of CTR.

An Examination Hypothesis proposed by Richardson et al. is used to model and eliminate position bias. See Matthew Richardson, Ewa Dominowska, and Robert Ragno. Predicting clicks: estimating the click-through rate for new ads. In *WWW '07: Proceedings of the 16$^{th}$ international conference on World Wide Web, pages* 521-520, New York, N.Y., USA, 2007. ACM Press, the disclosure of which is hereby expressly incorporated by reference. The probability that an ad item is clicked depends on the probability that it is examined and the probability that is clicked on, given that it is examined.

$$Prob(\text{click} = 1 \mid \text{item} = i, \text{position} = p)$$
$$= P(\text{click} = 1 \mid \text{item} = i, \text{position} = p, \text{examined} = 1) * P(\text{examined}$$
$$= 1 \mid \text{item} = i, \text{position} = p$$

This hypothesis assumes that the probability that an ad item is clicked on but not viewed is zero. It also assumes that the probability that an ad item is clicked is independent of its position, given that it is viewed, and that the probability of an ad item is viewed is independent of the ad, given the position and independent of other ads shown:

$$Prob(\text{click}=1 \mid \text{item}=i, \text{position}=p) = P(\text{click}=1 \mid \text{item}=i, \text{examined}=1) * P(\text{examined}=1 \mid \text{position}=p)$$

The CTR would therefore be the expression Prob (Click=1|item=i, examined=1).

From the data, the value of CTR can be estimated and by running experiments involving showing the same ad in multiple positions in the same module on the same page, the examination probability of a given position in a given module on a given page can be estimated. Using these two values, the true CTR of the item without any position bias can be obtained.

Conversion Probability Estimation

The conversion probability for a given sponsored item or product is defined as the probability at which a customer will buy the item i, after viewing it $p_i$=Prob(Buy$_i$=1|View$_i$=1). Two models for this problem were considered: 1) regression; and 2) non-linear tress based models like RandomForest. The feature sets for both the models include variables like availability, price, competitor's price, brand value, rating and reviews, etc.

Personalization

The retailer performance ad ranking is based on contextual matching but an added degree of personalization can help optimize better for performance. Personalization of ads for an individual customer is critical on low-context website pages like home and category pages. The generic nature of these website pages makes it necessary to show ads related to users browsing and purchase history. For other website page types like product pages, browse session level personalization will enable some amount of product rotation. In other words, if a customer has already seen a product and not clicked on it, then the probability of a click on the subsequent impression is likely to drop. The resultant rotation generates feedback data for improving models to estimate customer level CTR or Conversion Probability. Personalization in high-context website pages like product and search pages can also increase coverage in cases where there are no directly relevant ads for the context, but sponsored products based on customers' purchase and browsing history can act as a backfill.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A computer system comprising:
one or more computer processors; and
one or more non-transitory memory storage systems storing computing instructions configured to run on the one or more computer processors, wherein:
the computer system is configured to receive one or more first inputs from a first database comprising impressions, clicks, orders, and other key performance indicators (KPIs) used to estimate a click through rate (CTR) of online advertisements of products as a function of the one or more first inputs received;
the computer system is further configured to receive one or more website landing pages and to send a list of the one or more website landing pages to an optimization system;
the optimization system is configured to create an output of one or more sponsored product listings stored in a second database, wherein the computer system communicates with the second database;
the second database is configured to receive the online advertisements to display the one or more sponsored product listings on a website of a retailer, wherein the second database communicates with a device of a consumer;
a conversion probability system of the computer system is configured to determine a conversion probability estimation associated with the consumer using one or more KPIs, wherein the conversion probability estimation is a first probability that the consumer purchases a product after the consumer has clicked on an online advertisement shown on the website of the retailer, the online advertisement being for the product, and the online advertisements comprising the online advertisement, wherein the conversion probability estimation is based on Prob(Buy$_i$=1|View$_i$=1) where i is the product;

the computer system is further configured to analyze consumer data comprising a purchase history and a viewing history associated with the consumer to adjust a rank of the online advertisement for the product to be displayed on the website, wherein the online advertisement for the product is scheduled to be displayed on the website for the consumer a predetermined number of times as part of a rotation of the online advertisements for the products, the products comprising the product;

the optimization system of the computer system is further configured to optimize an estimated online revenue and an estimated online advertising spending, wherein the estimated online revenue is a function of at least the conversion probability estimation and an online advertisement rank position for the online advertisement on the website, wherein the estimated online advertising spending is a function of at least the CTR and the consumer data, wherein a second probability that the consumer will click on the product on the website of the retailer is based on a logistic regression model, wherein training the logistic regression model comprises, for each respective online advertisement for the product displayed on the website, using input data comprising the purchase history and the viewing history associated with the consumer, the one or more first inputs, the CTR of the online advertisements of the products calculated using a formula CTR=1/(1+exp(−($\beta_0$+ $\beta_1 x_1$+ . . . +$\beta_n x_n$))), wherein the formula CTR represents the second probability of a click, [$x_1$, $x_2$, . . . , $x_n$] are a set of significant features, and [$\beta_0$, $\beta_1$, . . . , $\beta_n$] are a set of coefficients, and the conversion probability estimation associated with the consumer, output data for the logistic regression model comprises respective indications that the consumer will click on the product based on the online advertisement for the product displayed on the website; and the computer system is further configured to generate, by the logistic regression model, as trained, a respective prediction of the second probability of each respective consumer clicking on the product based on the online advertisement for the product displayed on the website, and transmit the online advertisement of the product to the device of the consumer based on the output data for the logistic regression model, optimizing the estimated online revenue, and the estimated online advertising spending.

2. The computer system of claim 1, wherein the computer system further comprises a CTR estimation engine to estimate the CTR of the online advertisements of the products.

3. The computer system of claim 2, wherein the computer system further comprises the first database of the one or more first inputs of impressions, clicks, orders, and other KPIs and provides the one or more first inputs to the CTR estimation engine.

4. The computer system of claim 1, wherein the computer system further comprises a real-time database of online advertisement inventory, bid prices, and budgets, and provides the one or more first inputs to the optimization system.

5. The computer system of claim 1, wherein the optimization system is further configured to run an optimization process subject to business rules defined by the retailer.

6. The computer system of claim 1, wherein the computer system further comprises a third database of one or more landing pages for the website in addition to an online advertisement mapping system.

7. The computer system of claim 1, wherein the conversion probability system receives, by the one or more computer processors, the one or more first inputs from the first database.

8. The computer system of claim 2, wherein the CTR estimation engine further comprises a module of position bias correction.

9. The computer system of claim 1, wherein the computer system is configured to match, by the one or more computer processors, the online advertisements of the products by optimizing a website conversion rate for the website.

10. The computer system of claim 1, wherein the online advertisements of the products are further provided, by the one or more computer processors, from a third database of one or more landing pages in addition to an online advertisement mapping system.

11. A method comprising:

receiving, by a computer system using one or more processors, one or more first inputs from a first database comprising impressions, clicks, orders and other key performance indicators (KPIs) used to estimate a click through rate (CTR) of online advertisements of products as a function of the one or more first inputs received;

receiving, by the computer system, one or more website landing pages and sending a list of the one or more website landing pages to an optimization system;

creating, by the optimization system, an output of one or more sponsored product listings stored in a second database, wherein the computer system communicates with the second database;

receiving, by the second database, the online advertisements to display the one or more sponsored product listings on a website of a retailer, wherein the second database communicates with a device of a consumer;

using, by the computer system, a conversion probability system to determine a conversion probability estimation associated with a consumer using one or more KPIs, wherein the conversion probability estimation is a first probability that the consumer purchases a product after the consumer has clicked on an online advertisement shown on the website of the retailer, the online advertisement being for the product, and the online advertisements comprising the online advertisement, wherein the conversion probability estimation is based on Prob(Buy$_i$=1|View$_i$=1) where i is the product;

analyzing, with the computer system, consumer data comprising a purchase history and a viewing history associated with the consumer to adjust a rank of the online advertisement for the product to be displayed on the website, wherein the online advertisement for the product is scheduled to be displayed on the website for the consumer a predetermined number of times as part of a rotation of the online advertisements for the products, the products comprising the product;

estimating, with the computer system, the CTR of the online advertisements of the products based on the one or more first inputs received;

optimizing, with the computer system with an optimization system, an estimated online revenue and estimated online advertisement spending, wherein the estimated online revenue is a function of at least the conversion probability estimation and an online advertisement rank position for the online advertisement on the website, wherein the estimated online advertising spending is a function of at least the CTR and the consumer data, wherein a second probability that the consumer will click on the product on the website of the retailer is based on a logistic regression model, wherein training the logistic regression model comprises, for each respective online advertisement for the product displayed on the website, using input data comprising the purchase history and the viewing history associated with the consumer, the one or more first inputs, the CTR of the online advertisements of the products calculated using a formula $CTR=1/(1+\exp(-(\beta_0+\beta_1 x_1+\ldots+\beta_n x_n)))$, wherein the formula CTR represents the second probability of a click, $[x_1, x_2, \ldots, x_n]$ is a set of significant features, and $[\beta_0, \beta_1, \ldots, \beta_n]$ are a set of coefficients, and the conversion probability estimation associated with the consumer, wherein output data for the logistic regression model comprises respective indications that the consumer will click on the product based on the online advertisement for the product displayed on the website;

generating, by the logistic regression model, as trained, a respective prediction of the second probability of each respective consumer clicking on the product based on the online advertisement for the product displayed on the website, and transmitting, with the computer system, the online advertisement of the product to the device of the consumer based on the output data for the logistic regression model, optimizing the estimated online revenue, and the estimated online advertising spending.

12. The method of claim 11, wherein estimating, with the computer system, further comprises estimating a CTR estimation engine to estimate the CTR of the online advertisements of the products.

13. The method of claim 12, further comprising providing, with the computer system, the first database of the one or more first inputs of impressions, clicks, orders, and other KPIs and providing the one or more first inputs to the CTR estimation engine.

14. The method of claim 11, further comprising providing, with the computer system, a real-time database of online advertisement inventory, bid prices, and budgets, and providing the one or more first inputs to the optimization system.

15. The method of in claim 11, wherein the optimization system is further configured to run an optimization process subject to business rules defined by the retailer.

16. The method of claim 11, further comprising providing, with the computer system, a third database of one or more landing pages for the website in addition to an online advertisement mapping system.

17. The method of claim 11, including the conversion probability system receiving the one or more first inputs.

18. The method of claim 12, further comprising providing, with the computer system, a module of position bias correction for the CTR estimation engine.

19. The method of claim 11, further comprising matching, with the computer system, the one or more online advertisements of the products by optimizing for a website conversion rate for the website.

20. The method of claim 11, further comprising providing, with the computer system, a third database of one or more landing pages for the website in addition to an online advertisement mapping system for one or more sponsored products.

21. One or more non-transitory computer-readable storage media, having computer-executable instructions embodied thereon, wherein when executed by at least one processor, the computer-executable instructions cause the processor to:

receive one or more first inputs from a database comprising impressions, clicks, orders and other key performance indicators (KPIs) used to estimate a click through rate (CTR) of online advertisements of products as a function of the one or more first inputs received;

receive one or more website landing pages and sending a list of the one or more website landing pages to an optimization system;

create, by the optimization system, an output of one or more sponsored product listings stored in a second database, wherein a computer system communicates with the second database;

receive, by the second database, the online advertisements to display the one or more sponsored product listings on a website of a retailer, wherein the second database communicates with a device of a consumer;

use a conversion probability system to determine a conversion probability estimation associated with the consumer using one or more KPIs, wherein the conversion probability estimation is a first probability that the consumer purchases a product after the consumer has clicked on an online advertisement shown on the website of the retailer, the online advertisement being for the product, and the online advertisements comprising the online advertisement, wherein the conversion probability estimation is based on $\text{Prob}(\text{Buy}_i=1|\text{View}_i=1)$ where i is the product;

analyze consumer data comprising a purchase history and a viewing history associated with the consumer to adjust a rank of the online advertisement for the product to be displayed on the website, wherein the online advertisement for the product is scheduled to be displayed on the website for the consumer a predetermined number of times as part of a rotation of the online advertisements for the products, the products comprising the product;

estimate the CTR of online advertisements of the products based on the one or more first inputs received;

optimize with the optimization system an estimated online revenue and an estimated online advertisement spending, wherein the estimated online revenue is a function of at least the conversion probability estimation and an online advertisement rank position for the on online advertisement on the website, wherein the estimated online advertising spending is a function of at least the CTR and the consumer data, wherein a second probability that the consumer will click on the product on the website of the retailer is based on a logistic regression model, wherein training the logistic regression model comprises, for each respective online advertisement for the product displayed on the website, using input data comprising the purchase history and the viewing history associated with the consumer, the one or more first inputs, the CTR of the online advertisements of the products calculated using a formula $CTR=1/(1+\exp(-(\beta_0+$ $\beta_1 x_1 + + \beta_n x_n)))$, wherein the formula CTR represents the second probability of a click, $[x_1, x_2, \ldots, x_n]$ is a set of significant features, and $[\beta_0, \beta_1, \ldots, \beta_n]$ are a set of coefficients, and the conversion probability estimation associated with the consumer, output data for the logistic regression model comprises respective indications that the consumer will click on the product based on the online advertisement for the product displayed on the website;

generate, by the logistic regression model, as trained, a respective prediction of the second probability of each respective consumer clicking on the product based on the online advertisement for the product displayed on the website; and transmit the online advertisement of the product to the device of the consumer based on the output data for the logistic regression model, optimizing the estimated online revenue, and the estimated online advertising spending.

* * * * *